(12) United States Patent
Lai

(10) Patent No.: US 6,540,457 B1
(45) Date of Patent: Apr. 1, 2003

(54) MULTI-SECTION COVER DEVICE FOR A SLIDE WAY OF A MACHINING APPARATUS

(75) Inventor: Chang-San Lai, Taichung (TW)

(73) Assignee: Yih Chuan Machinery Industry Co., Ltd., Taichung (TW)

( * ) Notice: Subject to any disclaimer, the term of this patent is extended or adjusted under 35 U.S.C. 154(b) by 0 days.

(21) Appl. No.: 10/006,181

(22) Filed: Dec. 4, 2001

(51) Int. Cl.[7] ............................. B23C 9/00; B23Q 11/08
(52) U.S. Cl. ................................. 409/134; 29/DIG. 56; 29/DIG. 60; 74/613; 451/451; 108/3; 108/6; 108/9
(58) Field of Search ................................. 409/134, 235; 29/DIG. 56, DIG. 60, DIG. 94; 74/613, 608; 483/3; 451/451; 83/860; 108/5–7, 3–4, 9; 160/213

(56) References Cited

U.S. PATENT DOCUMENTS

| | | | | |
|---|---|---|---|---|
| 225,323 A | * | 3/1880 | Bennett ........................... 108/9 |
| 3,783,709 A | * | 1/1974 | Scott ............................ 74/612 |
| 3,919,949 A | * | 11/1975 | Rendleman .................. 451/451 |
| 4,350,193 A | * | 9/1982 | McCambridge et al. ... 144/286. |
| 4,863,320 A | * | 9/1989 | Rutschle et al. ......... 409/134 1 |
| 5,533,844 A | * | 7/1996 | Ekleberry ..................... 409/159 |
| 5,558,560 A | * | 9/1996 | Uchida .......................... 451/24 |
| 5,954,623 A | * | 9/1999 | Davis ........................... 483/35 |
| 6,257,811 B1 | * | 7/2001 | Schweizer et al. ........... 409/134 |
| 6,260,438 B1 | * | 7/2001 | Tabellini ..................... 409/134 |
| 6,406,228 B1 | * | 6/2002 | Xiao ........................... 409/134 |

FOREIGN PATENT DOCUMENTS

SU                    653-087 A    *   6/1976    .................. 409/134

\* cited by examiner

Primary Examiner—A. L. Wellington
Assistant Examiner—Erica E Cadugan
(74) Attorney, Agent, or Firm—Marger Johnson & McCollom, PC (57) ABSTRACT

A multi-section cover device is used to conceal a slide way for a work piece support of a machining apparatus, and includes a fixed shield member connected to the work piece support, a first movable shield member pivotally coupled to the fixed shield member, and a second movable shield member pivotally coupled to the first movable shield member. The first movable shield member has a roller unit for rolling contact with the slide way. A pair of link arms are pivotally connected to the second movable shield member, and have shield supporting edges for supporting a top wall of the second movable shield member.

2 Claims, 10 Drawing Sheets

FIG. 10

MULTI-SECTION COVER DEVICE FOR A SLIDE WAY OF A MACHINING APPARATUS

BACKGROUND OF THE INVENTION

1. Field of the Invention

The invention relates to a cover device, more particularly to a multi-section cover device for a slide way of a machining apparatus.

2. Description of the Related Art

Figure 1:
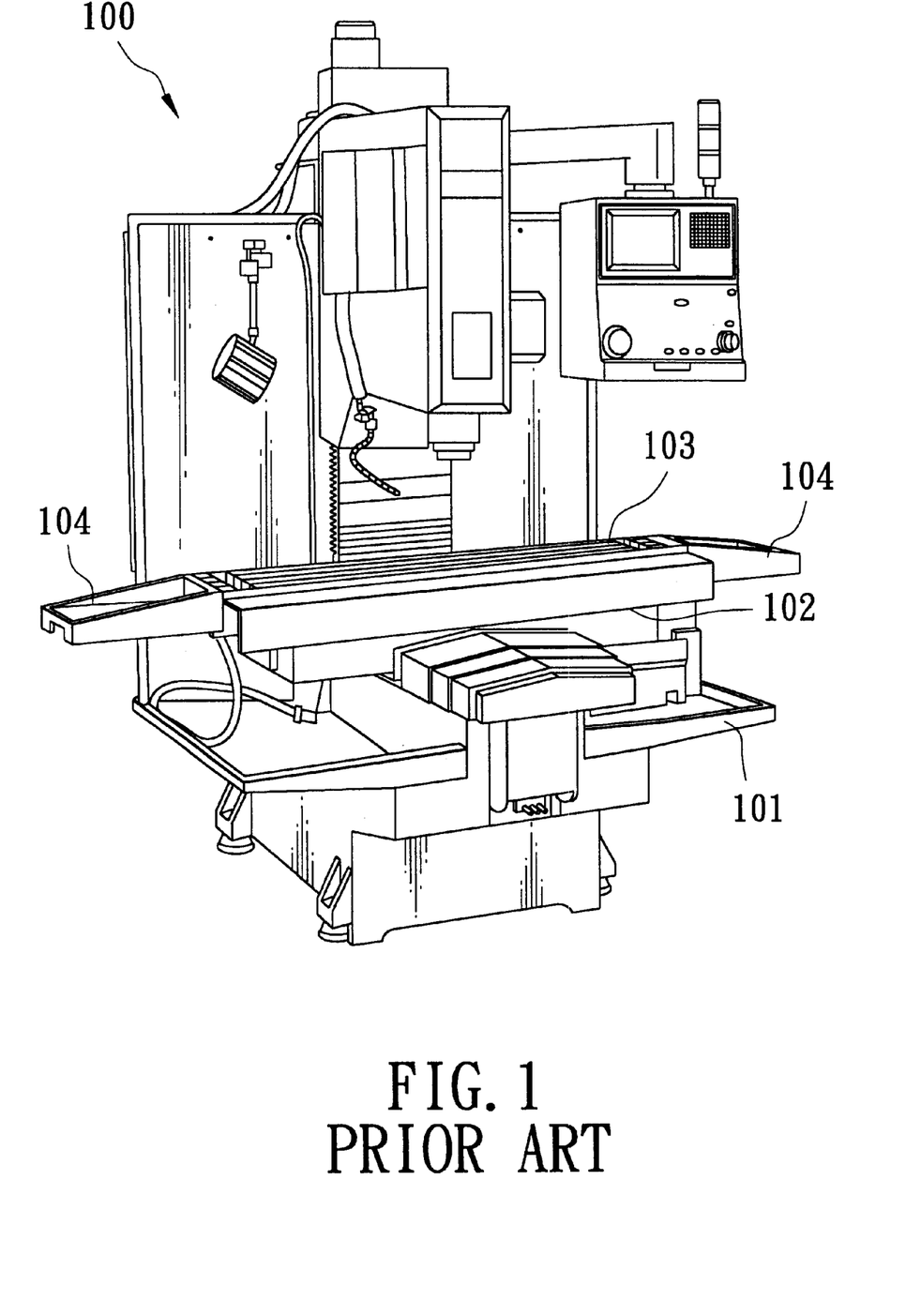
FIG. 1 is a perspective view of a conventional machining apparatus.

FIG. 1 illustrates a conventional machining apparatus 100 that includes a machining base 101 and a workpiece support 103. The machining base 101 is formed with a slide way 102 that extends in a longitudinal direction. The work piece support 103 is mounted movably on the machining base 101 and is linearly displaceable along the slide way 102. Work pieces are placed on the work piece support 103 when working on the same. As the work piece support 103 moves along the slide way 102, the slide way 102 will be partly exposed, and work piece fragments can fall into and collect in the slide way 102, thereby affecting smooth movement of the work piece support 103. As such, a pair of cover devices 104 are usually mounted on opposite ends of the work piece support 103 so as to ensure that the slide way 102 remains concealed during movement of the work piece support 103 therealong.

Figure 2:
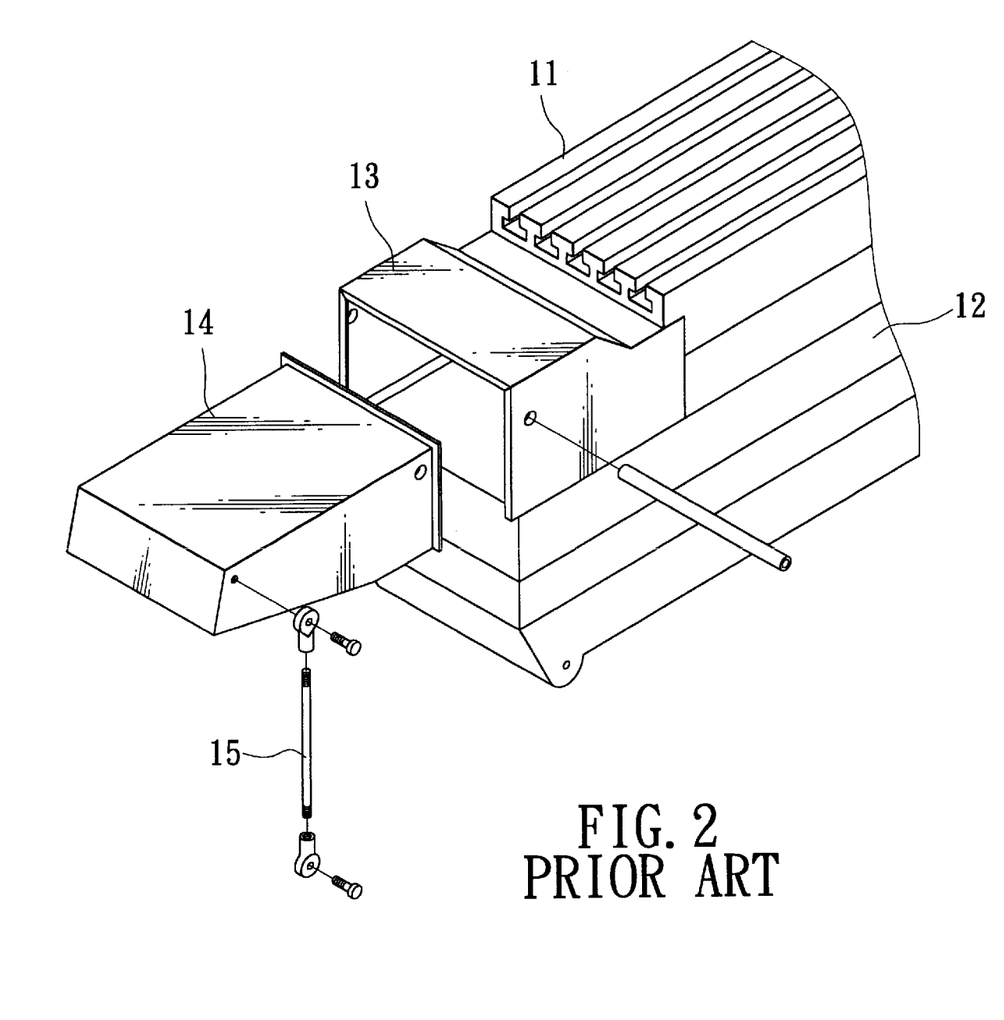
FIG. 2 is a partly exploded view showing a conventional cover device for a slide way of a machining apparatus.

FIG. 2 illustrates a conventional cover device for a slide way 12 of a machining apparatus. The cover device includes a fixed shield member 13 mounted on one end of a work piece support 11 that is movable along the slide way 12, and a movable shield member 14 coupled pivotally to the fixed shield member 13. A link arm 15 has one end connected pivotally to a machining base, and the other end connected pivotally to the movable shield member 14.

Figure 3:
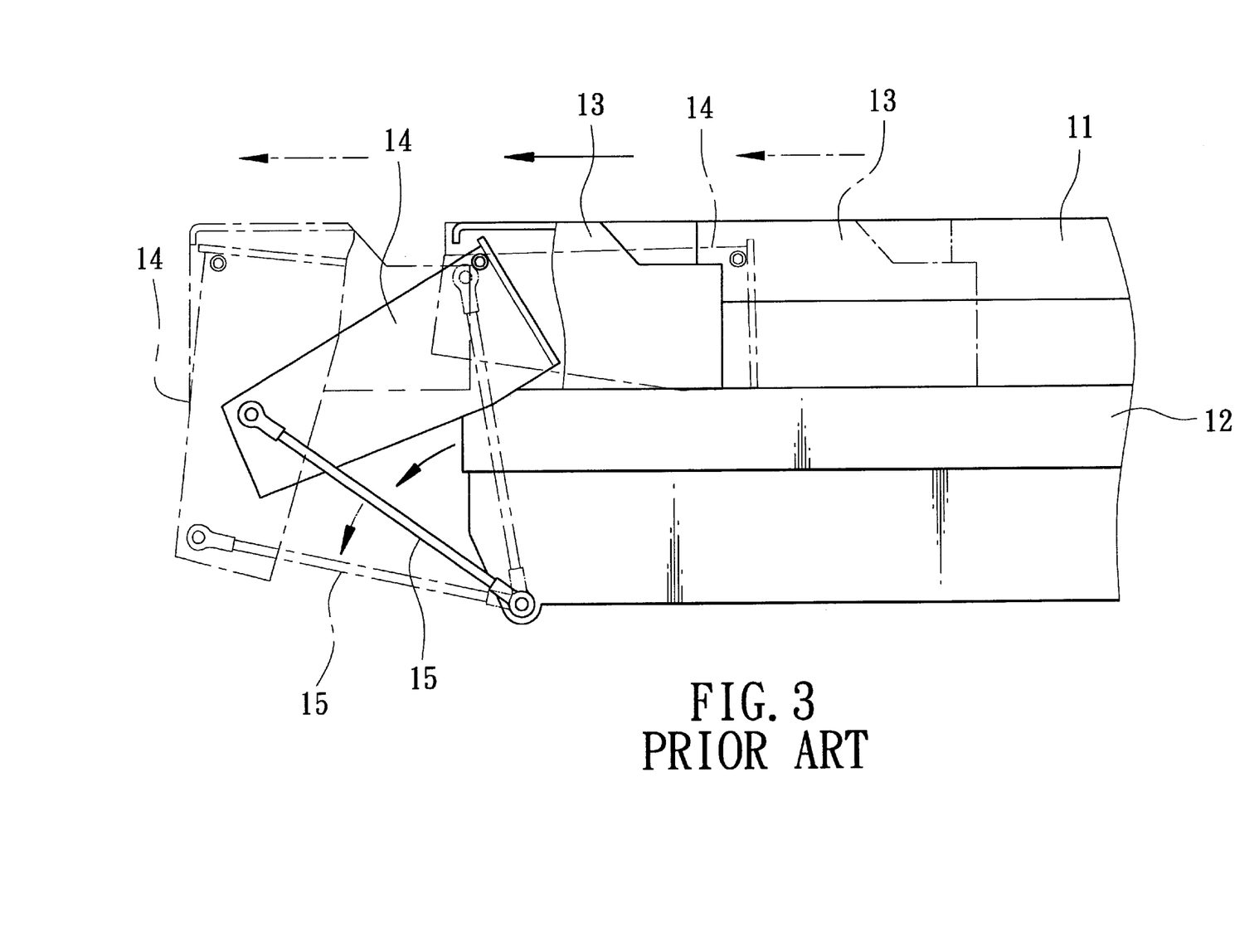
FIG. 3 is a schematic view illustrating the operation of the cover device of FIG. 2.

With further reference to FIG. 3, when the work piece support 11 moves toward one end of the slide way 12, the fixed shield member 13 will push the movable shield member 14. When the movable shield member 14 extends beyond the end of the slide way 12, the link arm 15 will pivot until the movable shield member 14 is in an almost vertical position and the link arm 15 is in a substantially horizontal position. The design as such results in a relatively short length of the cover device that projects from the end of the slide way 12.

Accordingly, when the work piece support 11 moves away from the end of the slide way 12, the fixed shield member 13 will pull the movable shield member 14 to dispose the latter once again above the slide way 12. As such, work piece fragments can be prevented from falling into and collecting in the slide way 12.

The following are some of the drawbacks of the conventional cover device of FIGS. 2 and 3:

1. The length of the slide way 12 increases with the size of the machining apparatus. Therefore, to ensure that the slide way 12 remains concealed at all times, either the fixed shield member 13 or the movable shield member 14 should be lengthened. The movable shield member 14 cannot be arbitrarily lengthened in view of its pivoting relationship with the link arm 15. On the other hand, the longer the fixed shield member 13, the longer will be the length of the cover device that projects from the end of the slide way 12.
2. Movement of the movable shield member 14 is not adequately supported. As the movable shield member 14 extends beyond the end of the slide way 12, the load of the movable shield member 14 will be concentrated at the pivot connection with the link arm 15, thereby affecting pivoting movement and resulting in severe wearing of the link arm 15.

SUMMARY OF THE INVENTION

The main object of the present invention is to provide a multi-section cover device for a slide way of a machining apparatus that is capable of overcoming the aforesaid drawbacks of the prior art.

According to the present invention, a multi-section cover device is adapted for use with a machining apparatus. The machining apparatus includes a machining base that is formed with a slide way which extends in a longitudinal direction and which has opposite sides spaced apart from each other in a transverse direction relative to the longitudinal direction, and a work piece support that is mounted movably on the machining base and that is linearly displaceable along the slide way. The cover device is adapted to be mounted on one end of the work piece support so as to ensure that the slide way remains concealed during movement of the work piece support along the slide way. The multi-section cover device comprises a fixed shield member, first and second movable shield members, and a pair of link arms.

The fixed shield member includes two upright first lateral plates spaced apart from each other in the transverse direction, and a first top plate extending in the transverse direction and interconnecting upper edges of the first lateral plates. Each of the first lateral plates has a first inner edge portion adapted to be connected fixedly to said one end of the work piece support, and a first outer edge portion opposite to the first inner edge portion in the longitudinal direction.

The first movable shield member includes two upright second lateral plates spaced apart from each other in the transverse direction, and a second top plate extending in the transverse direction and interconnecting upper edges of the second lateral plates. Each of the second lateral plates has a second inner edge portion connected pivotally to the first outer edge portion of a respective one of the first lateral plates, and a second outer edge portion opposite to the second inner edge portion in the longitudinal direction. The first movable shield member further includes a roller unit mounted on a bottom side surface of the second top plate and adapted to contact rollingly the slide way.

The second movable shield member includes two upright third lateral plates spaced apart from each other in the transverse direction, and a third top plate extending in the transverse direction and interconnecting upper edges of the third lateral plates. Each of the third lateral plates has a third inner edge portion connected pivotally to the second outer edge portion of a respective one of the second lateral plates, and a third outer edge portion opposite to the third inner edge portion in the longitudinal direction. The third outer edge portions of the third lateral plates have confronting inner wall surfaces.

The link arms are adapted to be disposed respectively on the opposite sides of the slide way. Each of the link arms has a lower pivot end portion adapted to be mounted pivotally on the machining base below the slide way, and an upper support end portion opposite to the pivot end portion. The support end portion of each of the link arms is disposed adjacent to the inner wall surface and is pivoted to the third outer edge portion of a respective one of the third lateral plates. The support end portion of each of the link arms is formed with a shield supporting edge that abuts against a bottom side surface of the third top plate when the second movable shield member extends beyond the length of the slide way due to movement of the work piece support along the slide way.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
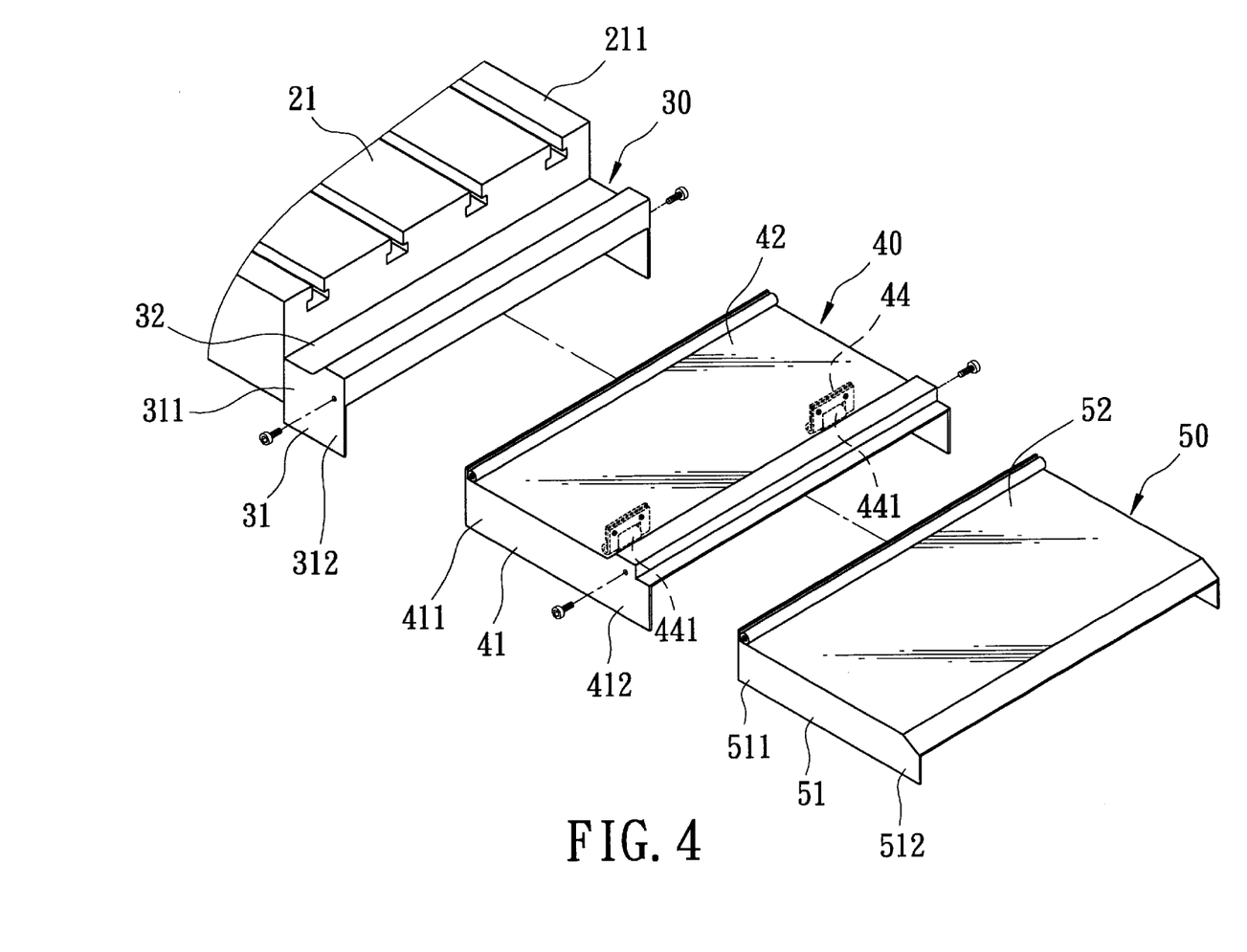
FIG. 4 is a fragmentary exploded perspective view showing the preferred embodiment of a multi-section cover device according to this invention.
Figure 5:
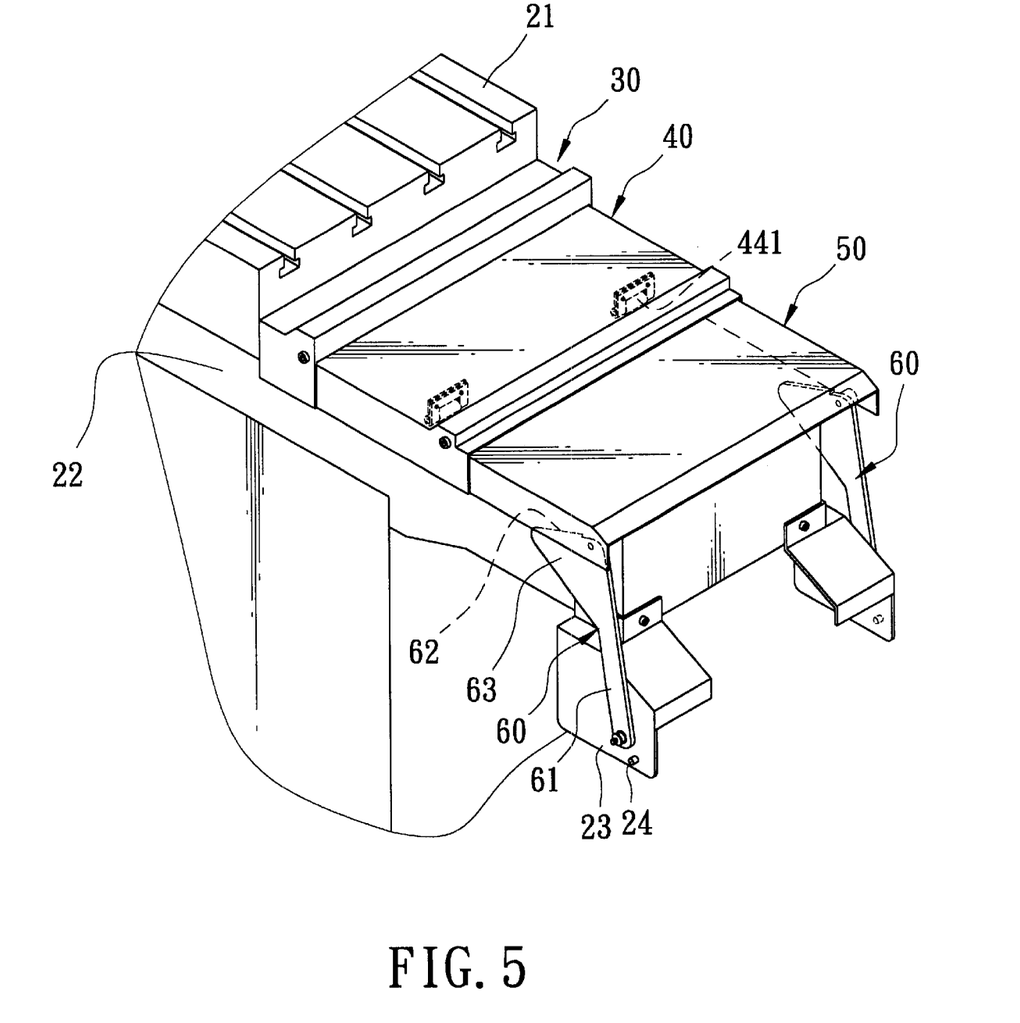
FIG. 5 is an assembled perspective view of the preferred embodiment.
Figure 6:
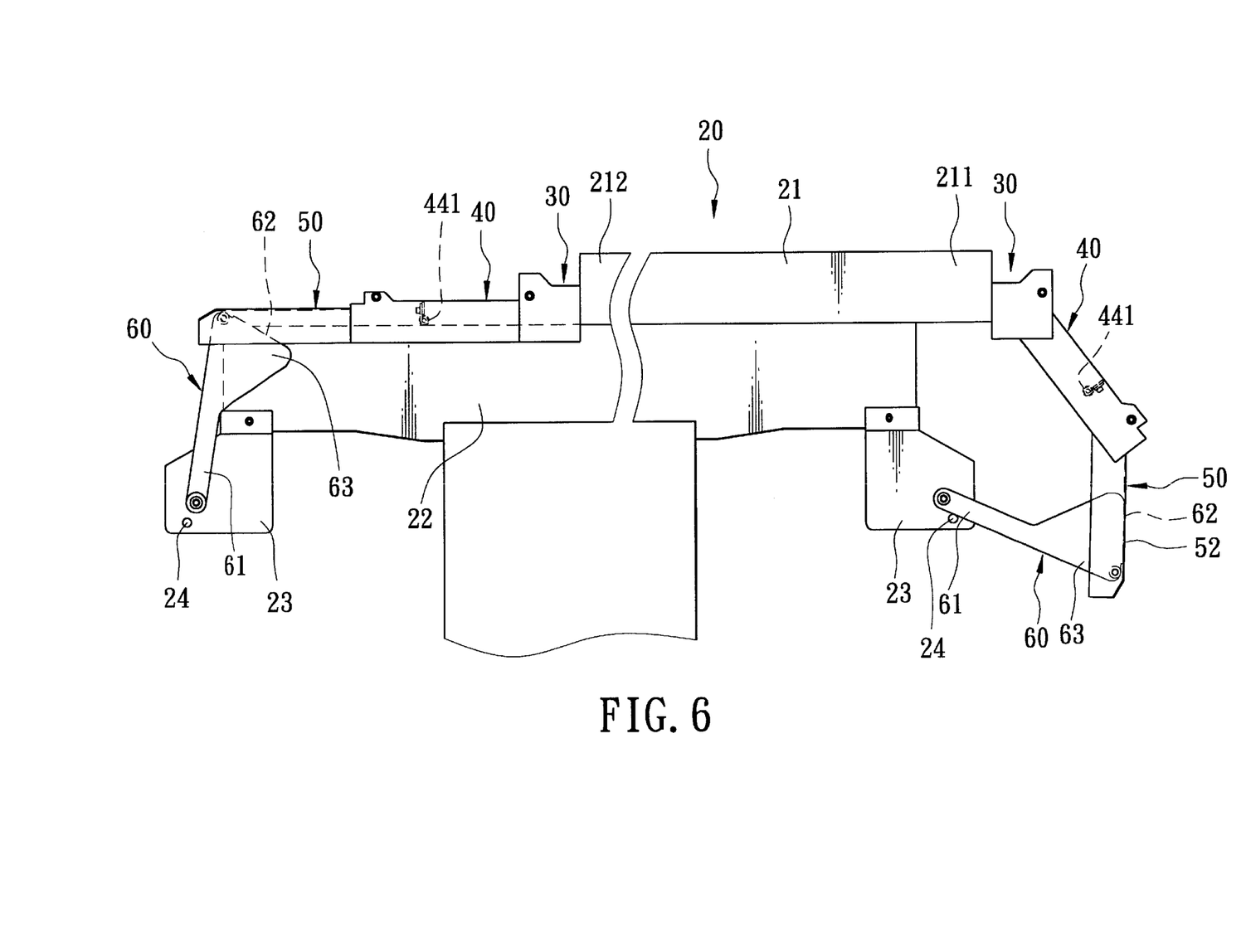
FIG. 6 is a fragmentary schematic view illustrating a machining apparatus that incorporates two cover devices of the preferred embodiment.

Referring to FIGS. 4, 5 and 6, the preferred embodiment of a multi-section cover device according to the present invention is shown to be adapted for use with a machining apparatus 20. The machining apparatus 20 includes a machining base that is formed with a slide way 22 which extends in a longitudinal direction and which has opposite sides spaced apart from each other in a transverse direction relative to the longitudinal direction, and a work piece support 21 that is mounted movably on the machining base and that is linearly displaceable along the slide way 22. A pair of mounting plates 23 are mounted on each end of the machining base and are disposed at the opposite sides of the slide way 22, respectively. Each of the mounting plates 23 has a stop projection 24 mounted thereon.

The multi-section cover device is adapted to be mounted on one end of the work piece support 21 so as to ensure that the slide way 22 remains concealed during movement of the work piece support 21 along the slide way 22. The multi-section cover device comprises a fixed shield member 30, a first movable shield member 40, a second movable shield member 50, and a pair of link arms 60.

The fixed shield member 30 includes two upright first lateral plates 31 spaced apart from each other in the transverse direction, and a first top plate 32 extending in the transverse direction and interconnecting upper edges of the first lateral plates 31. Each of the first lateral plates 31 has a first inner edge portion 311 adapted to be connected fixedly to one end 211 or 212 of the work piece support 21, and a first outer edge portion 312 opposite to the first inner edge portion 311 in the longitudinal direction.

The first movable shield member 40 includes two upright second lateral plates 41 spaced apart from each other in the transverse direction, and a second top plate 42 extending in the transverse direction and interconnecting upper edges of the second lateral plates 41. Each of the second lateral plates 41 has a second inner edge portion 411 connected pivotally to the first outer edge portion 312 of a respective one of the first lateral plates 31, and a second outer edge portion 412 opposite to the second inner edge portion 411 in the longitudinal direction. The first movable shield member 40 further includes a roller unit 44 mounted on a bottom side surface of the second top plate 42 and adapted to contact rollingly the slide way 22. In this embodiment, the roller unit 44 includes two roller members 441.

The second movable shield member 50 includes two upright third lateral plates 51 spaced apart from each other in the transverse direction, and a third top plate 52 extending in the transverse direction and interconnecting upper edges of the third lateral plates 51. Each of the third lateral plates 51 has a third inner edge portion 511 connected pivotally to the second outer edge portion 412 of a respective one of the second lateral plates 41, and a third outer edge portion 512 opposite to the third inner edge portion 511 in the longitudinal direction. Furthermore, the third outer edge portions 512 of the third lateral plates 51 have confronting inner wall surfaces.

The link arms 60 are adapted to be disposed respectively on the opposite sides of the slide way 22. Each of the link arms 60 has a lower pivot end portion 61 adapted to be mounted pivotally on a respective one of the mounting plates 23 below the slide way 22, and an upper support end portion 63 opposite to the lower pivot end portion 61. The support end portion 63 of each of the link arms 60 is disposed adjacent to the inner wall surface and is pivoted to the third outer edge portion 512 of a respective one of the third lateral plates 51. The support end portion 63 of each of the link arms 60 is formed with a shield supporting edge 62 that abuts against a bottom side surface of the third top plate 52 when the second movable shield member 50 extends beyond the length of the slide way 22 due to movement of the work piece support 21 along the slide way 22.

Figure 7:
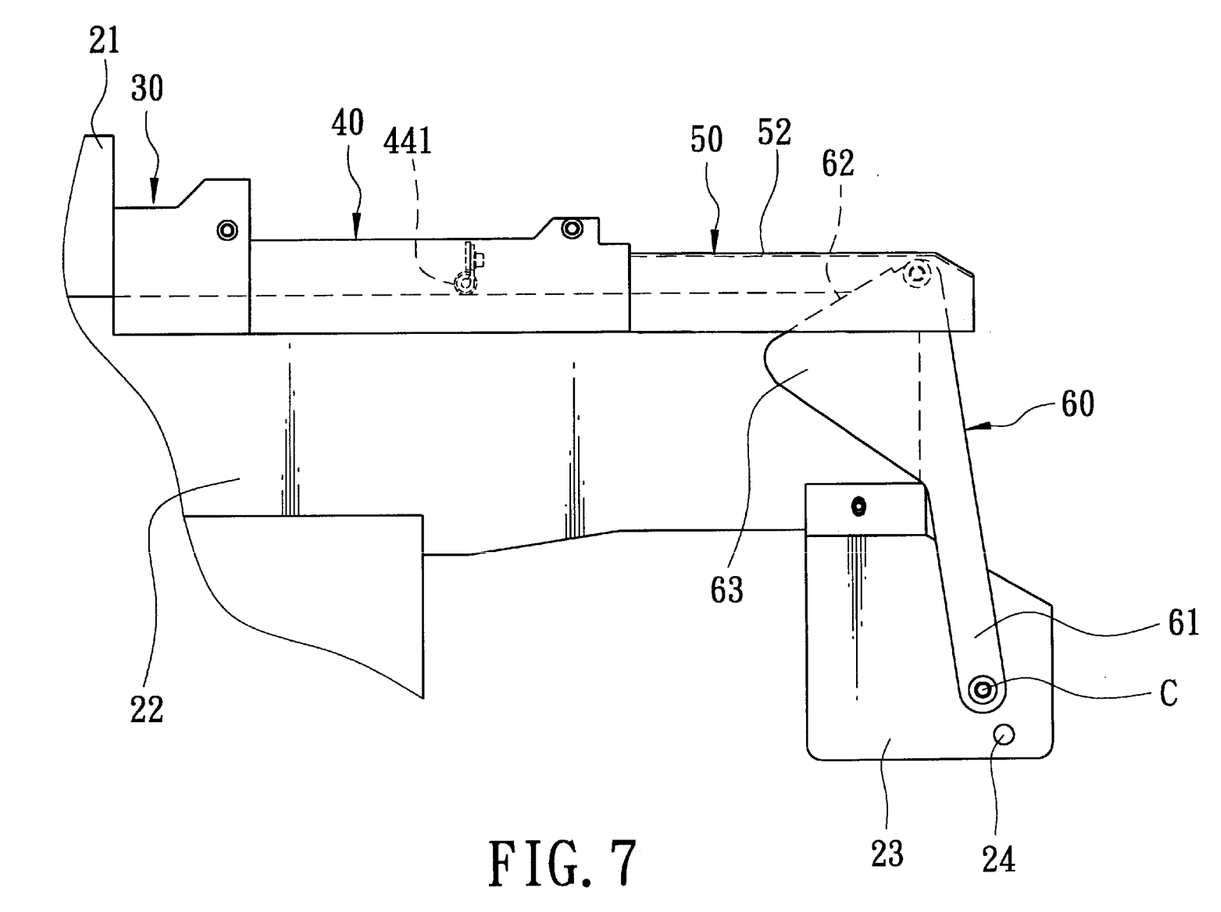
FIGS. 7 to 10 are fragmentary schematic views illustrating the operation of the preferred embodiment.
Figure 8:
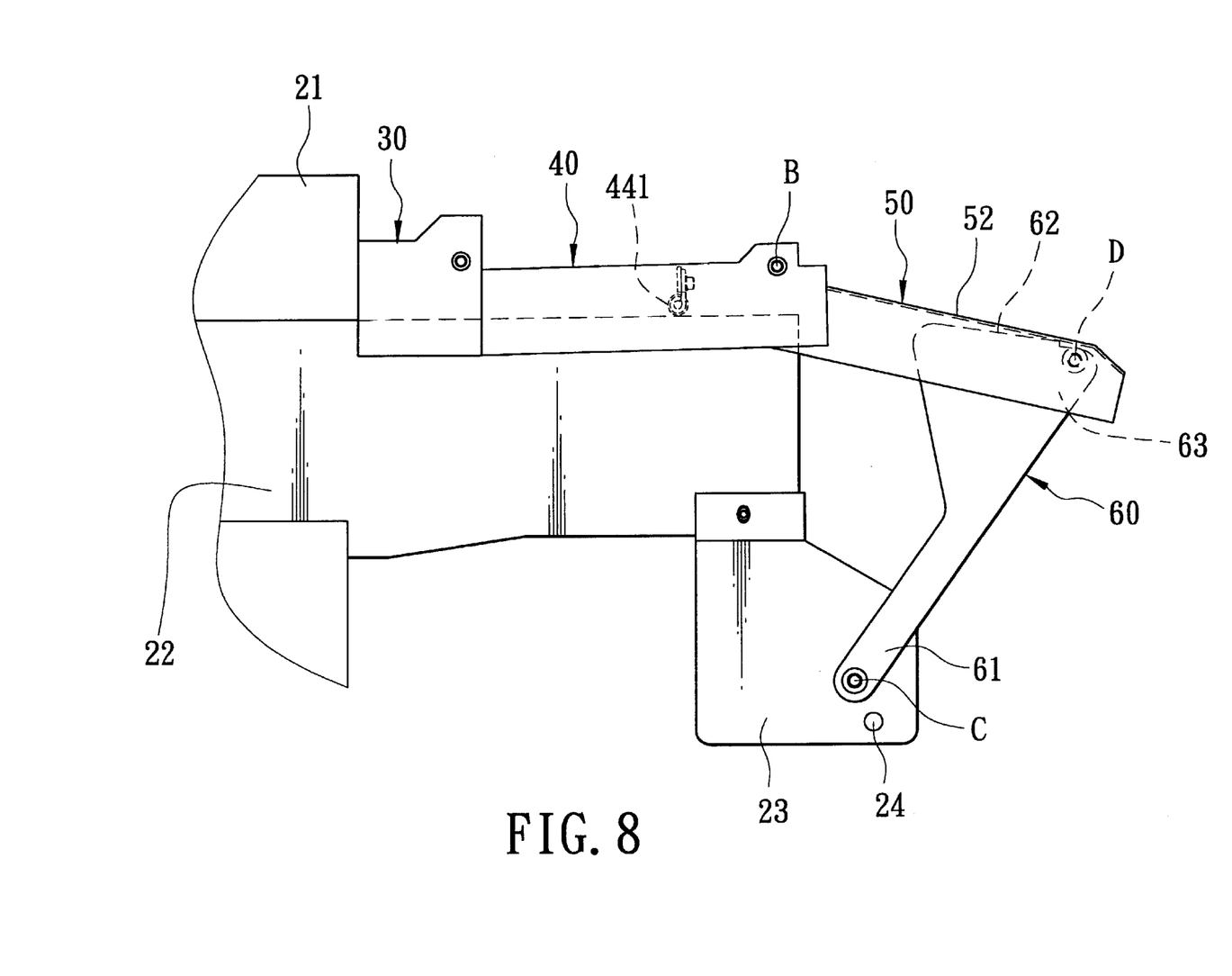

Referring to FIG. 7, when the work piece support 21 displaces linearly toward one end of the slide way 22, one end of the work piece support 21 will push the fixed shield member 30, the first movable shield member 40 and the second movable shield member 50 along the slide way 22, such that the link arms 60 pivot downward about pivot point (C). Up to this point, because the roller members 441 support the first movable shield member 40 on the slide way 22, and because the link arms 60 are connected to the second movable shield member 50, the weights of the first movable shield member 40 and the second movable shield member 50 will be shared by the link arms 60 and the roller members 441. Subsequently, with reference to FIG. 8, when the second movable shield member 50 extends beyond the length of the slide way 22, the second movable shield member 50 pivots relative to the first movable shield member 40 about pivot point (B), and further pivots relative to the link arms 60 about pivot point (D) to shorten the distance between the third top plate 52 and the shield supporting edges 62. The second movable shield member 50 is thus supported by both the first movable shield member 40 and the link arms 60 at this time.

Figure 9:
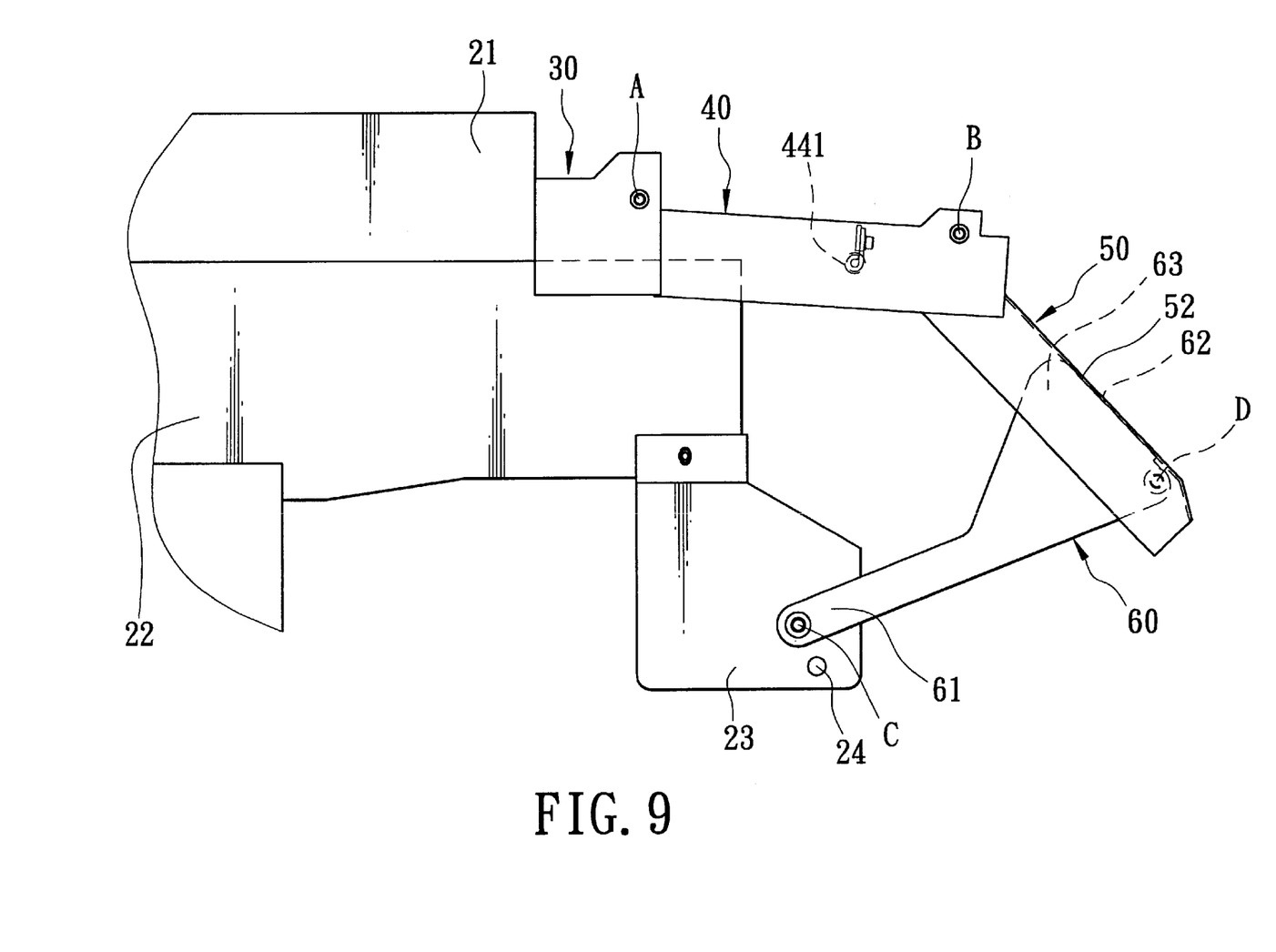

Thereafter, with reference to FIG. 9, due to continued linear displacement of the work piece support 21 along the slide way 22, the bottom surface of the third top plate 52 of the second movable shield member 50 eventually abuts against the shield supporting edges 62 of the link arms 60 to provide firm support. As such, even though the roller members 441 may cease to contact the slide way 22 such that the first movable shield member 40 pivots relative to the fixed shield member 30 about pivot point (A), an arched arrangement formed between the first and second movable shield members 40, 50, and the abutment of the second movable shield member 50 against the shield supporting edges 62 of the link arms 60, can ensure stability of further pivoting movement of the link arms 60.

Figure 10:
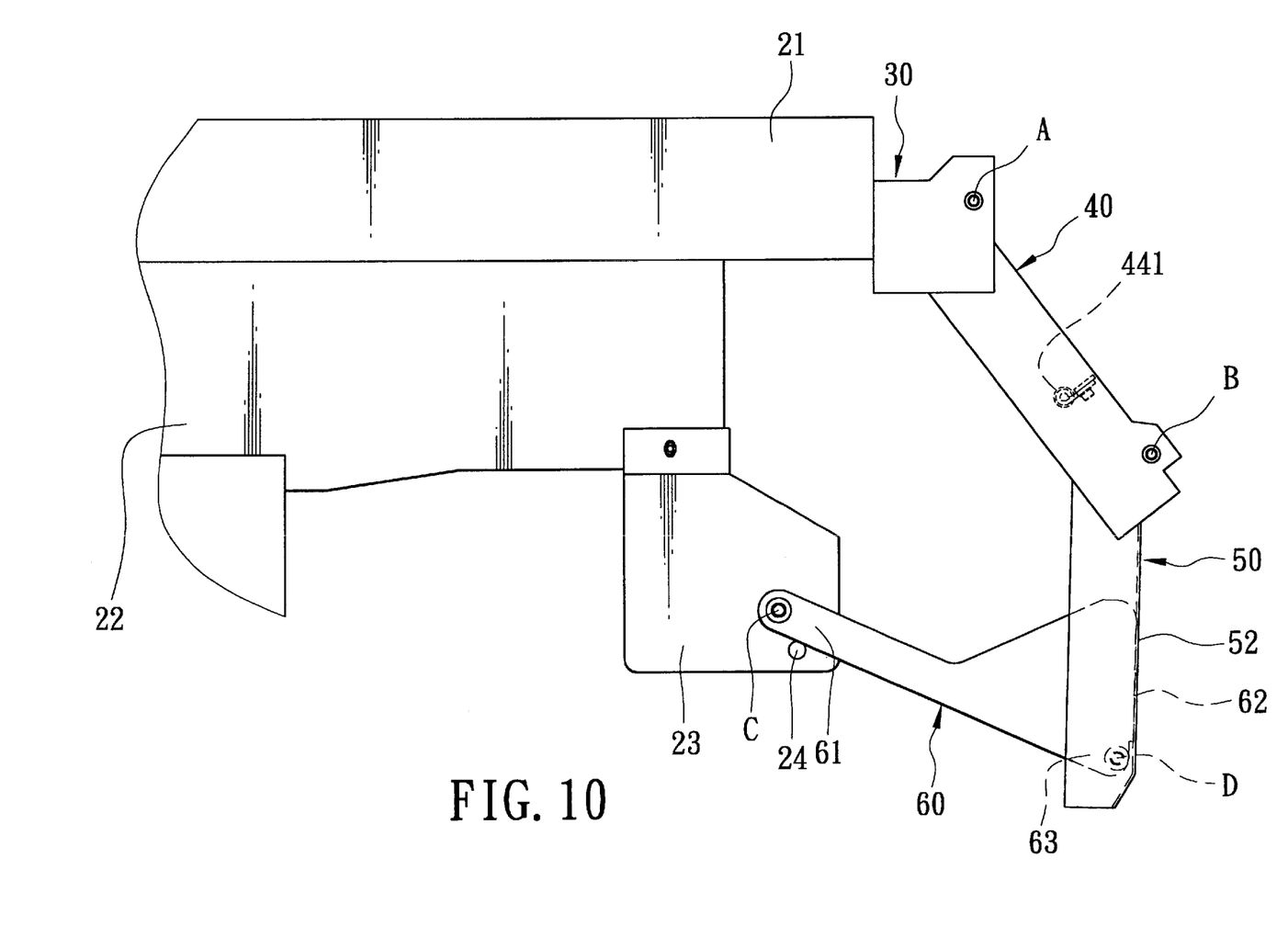

Finally, as shown in FIG. 10, when the work piece support 21 reaches a terminal position on the slide way 22, the link arms 60 cease to pivot due to abutment with the stop projections 24, respectively. At this time, the fixed shield member 30, the first movable shield member 40 and the second movable shield member 50 all extend beyond the end of the slide way 22, and the first movable shield member 40 and the second movable shield member 50 are in a fully folded state relative to the fixed shield member.

Accordingly, when the work piece support 21 displaces linearly away from the end of the slide way 22, the work piece support 21 will pull the fixed shield member 30, the first movable shield member 40 and the second movable shield member 50, such that the link arms 60 pivot upward about the pivot point (C), to eventually dispose the shield members 30, 40, 50 above the slide way 22. As such, work piece fragments can be prevented from falling into and collecting in the slide way 22 by the cover device of this invention.

Furthermore, when the multi-section cover device of this invention is applied to a big-sized machining apparatus, the number of first movable shield members 40 can be increased accordingly. In this situation, the first movable shield members 40 are connected pivotally in sequence between the fixed shield member 30 and the second movable shield member 50. In this manner, the lengths of the shield members 30, 40, 50 can be shortened.

The following are some of the advantages that can be attributed to the multi-section cover device of the present invention:

1. The slide way 22 of a big-sized machining apparatus can be adequately concealed without increasing the lengths of the shield members 30, 40, 50 and without a long projecting length of the cover device from the adjacent end of the slide way 22.
2. The roller units 44 can ensure smooth movement of the first and second movable shield members 40, 50 on the slide way 22. Also, the load distribution during the various stages of operation of the cover device can ensure smooth pivoting movement of the link arms 60 and can minimize the occurrence of load concentration that can lead to component wearing and shortening of the service life of the cover device.
3. The possibility of using two or more first movable shield members 40 makes this invention more flexible and practical for application to a big-sized machining apparatus.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A multi-section cover device for a machining apparatus, the machining apparatus including a machining base that is formed with a slide way which extends in a longitudinal direction and which has opposite sides spaced apart from each other in a transverse direction relative to the longitudinal direction, and a work piece support that is mounted movably on the machining base and that is linearly displaceable along the slide way, said cover device being adapted to be mounted on one end of the work piece support so as to ensure that the slide way remains concealed during movement of the work piece support along the slide way, said multi-section cover device comprising:

a fixed shield member including two upright first lateral plates spaced apart from each other in the transverse direction, and a first top plate extending in the transverse direction and interconnecting upper edges of said first lateral plates, each of said first lateral plates having a first inner edge portion adapted to be connected fixedly to said one end of the work piece support, and a first outer edge portion opposite to said first inner edge portion in the longitudinal direction;

a first movable shield member including two upright second lateral plates spaced apart from each other in the transverse direction, and a second top plate extending in the transverse direction and interconnecting upper edges of said second lateral plates, each of said second lateral plates having a second inner edge portion connected pivotally to said first outer edge portion of a respective one of said first lateral plates, and a second outer edge portion opposite to said second inner edge portion in the longitudinal direction;

said first movable shield member further including a roller unit mounted on a bottom side surface of said second top plate and adapted to contact rollingly the slide way;

a second movable shield member including two upright third lateral plates spaced apart from each other in the transverse direction, and a third top plate extending in the transverse direction and interconnecting upper edges of said third lateral plates, each of said third lateral plates having a third inner edge portion connected pivotally to said second outer edge portion of a respective one of said second lateral plates, and a third outer edge portion opposite to said third inner edge portion in the longitudinal direction, said third outer edge portions of said third lateral plates having confronting inner wall surfaces; and a pair of link arms adapted to be disposed respectively on the opposite sides of the slide way, each of said link arms having a lower pivot end portion adapted to be mounted pivotally on the machining base below the slide way, and an upper support end portion opposite to said pivot end portion;

said support end portion of each of said link arms being disposed adjacent an associated inner wall surface and being pivoted to said third outer edge portion of a respective one of said third lateral plates;

said support end portion of each of said link arms being formed with a shield supporting edge that abuts against a bottom side surface of said third top plate when said second movable shield member extends beyond a length of the slide way due to movement of the work piece support along the slide way.

2. The multi-section cover device as claimed in claim 1, further comprising a pair of stop projections adapted to be mounted on the machining base at opposite sides of the slide way, respectively, so as to limit an extent of pivoting movement of a respective one of said link arms.

* * * * *